US010641974B2

(12) United States Patent
Dmitriev et al.

(10) Patent No.: US 10,641,974 B2
(45) Date of Patent: May 5, 2020

(54) OPTICAL THREE-PORT FORK-LIKE CIRCULATOR BASED ON A TWO-DIMENSIONAL PHOTONIC CRYSTAL WITH A TRIANGULAR LATTICE

(71) Applicant: UNIVERSIDADE FEDERAL DO PARÁ, Guamá, Belém—Pará (BR)

(72) Inventors: Victor Dmitriev, Pará (BR); Leno Rodrigues Martins, Pará (BR); Gianni Masaki Tanaka Portela, Pará (BR)

(73) Assignee: UNIVERSIDADE FEDERAL DO PARÁ (BR)

( * ) Notice: Subject to any disclaimer, the term of this patent is extended or adjusted under 35 U.S.C. 154(b) by 0 days.

(21) Appl. No.: 15/570,205

(22) PCT Filed: Apr. 29, 2016

(86) PCT No.: PCT/BR2016/050097
§ 371 (c)(1),
(2) Date: Oct. 27, 2017

(87) PCT Pub. No.: WO2016/172779
PCT Pub. Date: Nov. 3, 2016

(65) Prior Publication Data
US 2018/0128997 A1    May 10, 2018

(30) Foreign Application Priority Data
Apr. 29, 2015    (BR) .................... BR102015010961-0

(51) Int. Cl.
*G02F 1/03*    (2006.01)
*G02F 1/07*    (2006.01)
(Continued)

(52) U.S. Cl.
CPC ............ *G02B 6/4204* (2013.01); *B82Y 20/00* (2013.01); *G02B 6/10* (2013.01); *G02B 6/12* (2013.01);
(Continued)

(58) Field of Classification Search
CPC ...... B82Y 20/00; G02B 6/1225; G02B 6/125; G02B 6/26; G02B 6/2746; G02B 6/036;
(Continued)

(56) References Cited

U.S. PATENT DOCUMENTS

| 8,699,835 B2 | 4/2014 | Ouyang et al. ................. 385/27 |
| 2003/0016915 A1* | 1/2003 | Prather ................. B82Y 20/00 385/50 |

(Continued)

FOREIGN PATENT DOCUMENTS

| CN | 101571657 A | * 11/2009 |
| CN | 104101947 | 10/2014 ............ G02B 6/122 |

OTHER PUBLICATIONS

Dmitriev et al., "Optical component: nonreciprocal three-way divider based on magneto-optical resonator," Applied Optics, vol. 52, No. 27, Sep. 20, 2013, abstract only (2 pgs).
(Continued)

*Primary Examiner* — Mahidere S Sahle
(74) *Attorney, Agent, or Firm* — Hayes Soloway PC

(57) ABSTRACT

Provided a two-dimensional photonic crystal device in which are inserted three waveguides and one resonant cavity by the creation of linear and local defects. Due to the photonic band gap related to the photonic crystal, electromagnetic signals are confined to the interior of waveguides and resonant cavity. By exciting dipole modes in the resonant cavity, with orientation that depends on the intensity of the applied DC magnetic field, the present circulator device can provide the nonreciprocal transmission of signals in the (Continued)

clockwise and counterclockwise directions. It can fulfill the isolation function and it is fork-shaped, providing greater flexibility in the design of integrated optical communication systems.

16 Claims, 6 Drawing Sheets

(51) Int. Cl.
| | |
|---|---|
| *G02B 6/42* | (2006.01) |
| *B82Y 20/00* | (2011.01) |
| *G02B 6/10* | (2006.01) |
| *G02B 6/122* | (2006.01) |
| *G02B 6/12* | (2006.01) |
| *G02F 1/095* | (2006.01) |
| *G02B 6/125* | (2006.01) |

(52) U.S. Cl.
CPC ............ *G02B 6/1225* (2013.01); *G02B 6/42* (2013.01); *G02F 1/0955* (2013.01); *G02B 6/125* (2013.01); *G02B 2006/1213* (2013.01); *G02B 2006/12147* (2013.01); *G02F 2202/32* (2013.01)

(58) Field of Classification Search
CPC ..... G02B 6/10; G02F 1/0955; G02F 2202/32; H01P 1/38
USPC .......................................... 359/245, 322–324
See application file for complete search history.

(56) References Cited

U.S. PATENT DOCUMENTS

| | | | |
|---|---|---|---|
| 2012/0243844 A1* | 9/2012 | Ouyang | B82Y 20/00 385/130 |
| 2012/0251048 A1 | 10/2012 | Ouyang et al. | 385/50 |
| 2013/0223805 A1 | 8/2013 | Ouyang et al. | 385/130 |

OTHER PUBLICATIONS

International Preliminary Report on Patentability (w/translation) issued in application No. PCT/BR2016/050097, dated Oct. 31, 2017 (13 pgs).
International Search Report and Written Opinion (w/translation) issued in application No. PCT/BR2016/050097, dated Aug. 30, 2016 (18 pgs).
Kim et al., "Highly efficient photonic crystal-based multi-channel drop filters of three-port system with reflection feedback," Optics Express, vol. 12, No. 22, Nov. 1, 2004 (8 pgs).
Wang et al., "Magneto-optical defects in two-dimensional photonic crystals," Appl. Phys. B 81, 369-375 (2005) (7 pgs).
Zhang et al., "Design of nonreciprocal waveguide devices based on two-dimensional magneto-optical photonic crystals," Optics & Laser Technology, vol. 50, Sep. 2013, abstract only (2 pgs).

* cited by examiner

OPTICAL THREE-PORT FORK-LIKE CIRCULATOR BASED ON A TWO-DIMENSIONAL PHOTONIC CRYSTAL WITH A TRIANGULAR LATTICE

BACKGROUND OF THE INVENTION

The present invention relates to a three-port circulator with shape that resembles a fork, based on a two-dimensional photonic crystal with triangular lattice.

In optical communication systems, this device can be mostly used on the protection of signal sources and amplifiers against parasitic reflections that can arise in these systems (isolation function).

By employing photonic crystal technology in its design, the presented device can be built with reduced dimensions when compared to circulators based on other technologies. This feature favors the use of the proposed circulator in systems requiring high integration density of components.

Photonic crystals are structures comprised by materials with different refractive indexes, periodically distributed in one, two or three spatial dimensions. They possess a forbidden frequency range, known as photonic band gap, whose existence is associated to the spatial periodicity of these crystals.

Electromagnetic waves with frequency located inside this range cannot propagate along the photonic crystal, being totally reflected by it. The functioning principle of most of the devices based on the photonic crystal technology is associated to the existence of the photonic band gap.

Circulators are mainly used to perform the isolation function in integrated communication systems. This function refers to the protection of signal sources and amplifiers against parasitic reflections, usually coming from unmatched components connected to these systems. These reflections cause instabilities on the functioning of these systems and their effects can be mitigated by the utilization of devices like the presented circulator.

Because it is a nonreciprocal device, the scattering matrix of a circulator is not symmetrical, that is, the device behavior does not remain the same when the input becomes the output and vice versa. For example, in a three-port circulator (1, 2 and 3), the signals transmission (input port→output port) can occur in the clockwise direction (1→2, 2→3 e 3→1) or in the counterclockwise direction (1→3, 3→2 e 2→1).

Several patents related to photonic crystals based circulators have been deposited, among which we highlight the following ones.

The circulator described in the patent of invention US20120243844 is based on a two-dimensional photonic crystal comprised by a triangular lattice of holes etched in a material with magneto-optical properties, subjected to an external magnetic field. This circulator possesses three waveguides (three ports) symmetrically connected to a resonant cavity located in the center of the device, and its format resembles the letter Y.

On the other hand, the report describing the patent of invention US20130223805 presents a circulator based on a two-dimensional photonic crystal comprised by a square lattice of dielectric rods immersed in air. It possesses three waveguides connected in a T-shape and a resonant cavity comprised by ferrite rods (whose magnetic permeability varies accordingly to the intensity of an external magnetic field) and dielectric rods with different radius (when compared to the remaining rods that comprise the photonic crystal).

The patent of invention US20120251048 refers to a four-port circulator based on a two-dimensional photonic crystal with triangular lattice of holes etched in a magneto-optical material. In this case, two coupled resonant cavities are inserted in the photonic crystal. The properties of the magneto-optical material in which these cavities are based depend on the intensity of an external magnetic field applied to the material.

Finally, the circulator described in the patent CN104101947 possesses three ports and it is based on a two-dimensional photonic crystal with square lattice of dielectric rods (with square cross-section) immersed in air. The resonant cavity that comprises the device is based on a central dielectric rod with square cross-section, made of a magneto-optical material, and on four dielectric rods with triangular cross-section, while the three waveguides are connected to the cavity so that the final layout resembles the format of the letter T.

SUMMARY OF THE INVENTION

The present circulator is characterized by the unusual fork-shape. This provides greater flexibility on the design of communication systems with high integration density of components, in which the possibility of using devices with different geometries is desirable.

Circulators based on metallic waveguides or microstrip lines are usually employed in communication systems operating with microwave frequencies. However, in the frequency range employed by optical communication systems, the utilization of these devices is not feasible, because their materials show high losses in this frequency range.

The present circulator can be used in the optical frequency range, because the magneto-optical material in which it is based shows low losses in this frequency range.

Besides, the electric permittivity of the magneto-optical material that comprises the device varies accordingly to the intensity of an external DC magnetic field. In this case, the magnetization of the material is uniform and an electromagnet can be used for the realization of this function, simplifying the magnetization circuit of the structure. The intensity of the magnetic field generated by the electromagnet is proportional to the intensity of the electric current that flow through it.

Among the performance characteristics of the developed circulator, we highlight the low insertion losses between input and output, the high isolation levels between input and isolated port and the wide operating bandwidth.

Generally speaking, the developed circulator possesses three ports and it consists of a two-dimensional photonic crystal based on a triangular lattice of holes etched in a material with magneto-optical properties. Three waveguides (each of them associated with one of the ports) and a resonant cavity are inserted in the crystal by creating a number of defects, in a controlled manner, in the periodic structure of the crystal. Electromagnetic signals propagating along the photonic crystal are confined to these defects, due to the existence of the photonic band gap. The created defects are classified as follows:

a) Linear defects: correspond to the removal of holes in straight line and originate the device waveguides;

b) Local defects: correspond to the modification of radius and position of holes located in the center of the device and originate the resonant cavity of the device.

In a specific way, the present circulator has the following features:

The photonic crystal in which the device is based has a lattice constant (a) that depends on the operating frequency range (operating wavelength). For the case in which the operating wavelength (λ) is equal to 1.55 μm, wavelength value usually employed in optical communication systems, a is equal to 480 nm;

The holes etched in the magneto-optical material and related to the periodic structure of the photonic crystal has radius 0.3a;

Three waveguides are inserted in the photonic crystal by the creation of three linear defects;

One resonant cavity is inserted in the photonic crystal by the creation of several local defects in the central region of the crystal;

When an external DC magnetic field +H0 is applied to the photonic crystal, the propagation of electromagnetic signals (input port→output port) occurs in the counterclockwise direction (1→3, 3→2, and 2→1);

When an external DC magnetic field −H0 is applied to the photonic crystal, the propagation of electromagnetic signals (input port→output port) occurs in the clockwise direction (1→2, 2→3, and 3→1);

The magneto-optical material in which the photonic crystal is based is anisotropic, with electric permittivity tensor ([ε]) and magnetic permeability (μ) equal to:

$$[\varepsilon] = \varepsilon_0 \begin{pmatrix} 6.25 & -ig & 0 \\ ig & 6.25 & 0 \\ 0 & 0 & 6.25 \end{pmatrix}; \mu = \mu_0$$

Where:
a) [ε] is the electric permittivity tensor of the material (in Farads per meter);
b) $\varepsilon_0$ is the electric permittivity of free space (in Farads per meter);
c) μ is the magnetic permeability of the material (in Henrys per meter);
d) $\mu_0$ is the magnetic permeability of free space (in Henrys per meter);
e) i is the imaginary unit;
f) g is a parameter that depends on the intensity of the external DC magnetic field.

BRIEF DESCRIPTION OF THE DRAWINGS

In the following, the performance characteristics and the operating principle of the device will be presented with the support of several figures.

In FIGS. 2a, 2b and 2c, the cases in which the excitation is applied to ports 1, 2 and 3 are presented, respectively.

FIGS. 3a, 3b and 3c correspond to the cases in which the excitation is applied to ports 1, 2 and 3, respectively.

DETAILED DESCRIPTION OF THE INVENTION

Figure 1:
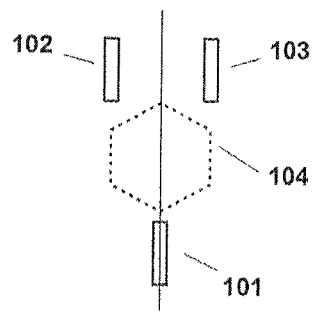
FIG. 1 shows, in a simplified manner, the structure of the developed circulator.

The developed circulator is comprised by the waveguides 1 (101), 2 (102) and 3 (103), connected to a resonant cavity 104 such that the final design resembles the format of a fork (FIG. 1).

Figure 2:
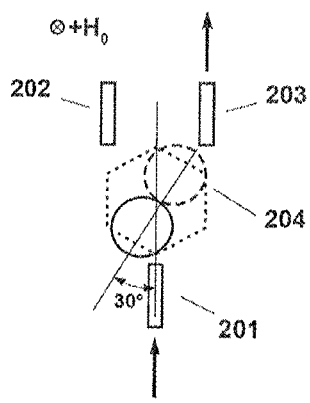
FIG. 2 presents, in a simplified manner, the operation of the circulator when a DC magnetic field +H₀ is applied.
Figure 2:
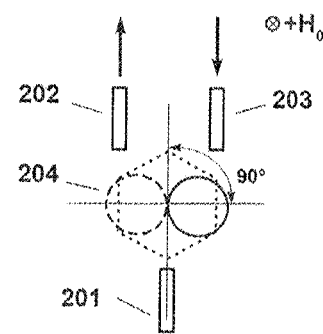
Figure 2:
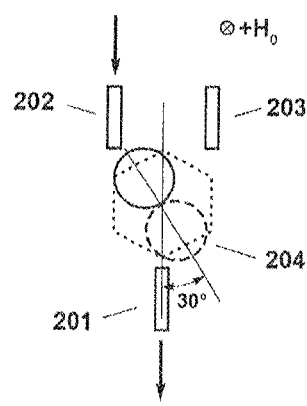

In the case where a DC magnetic field +H₀ is applied to the circulator, it occurs the nonreciprocal transmission of signals in counterclockwise direction, as can be seen, in a schematic manner, in FIG. 2. In this case, the value of the parameter g is equal to 0.3. Electromagnetic signals applied to the waveguides 201 (FIG. 2a), 203 (FIG. 2b) and 202 (FIG. 2c) excite dipole modes 204, inside the resonant cavity, whose orientations allow the transmission of the signals, with low insertion losses, to the waveguides 203, 202 e 201, respectively. In these cases, waveguides 202, 201 and 203 are isolated, respectively.

Figure 3:
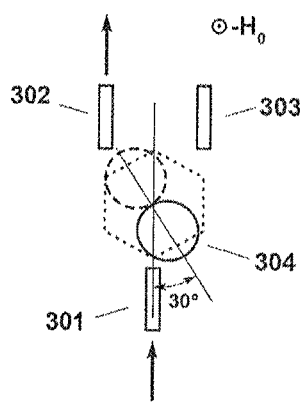
FIG. 3 shows, in a simplified manner, the case in which the circulator is operating and subjected to the application of a DC magnetic field −H₀.
Figure 3:
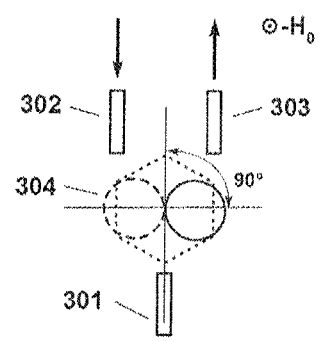
Figure 3:
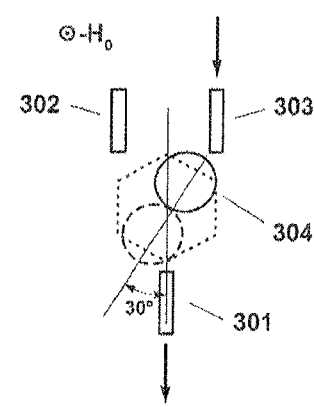

On the other hand, in the case where the circulator is subjected to the application of a DC magnetic field −H₀, the nonreciprocal transmission of signals occurs in the clockwise direction, as can be seen, in a schematic manner, in FIG. 3. In this case, the parameter g is −0.3. The application of electromagnetic signals to the waveguides 301 (FIG. 3a), 302 (FIG. 3b) and 303 (FIG. 3c) excites, inside the resonant cavity, dipole modes 304, whose orientations allow the transmission of these signal, with low insertion losses, to the waveguides 302, 303 and 301, respectively. In these cases, waveguides 303, 301 and 302 are isolated, respectively.

Figure 4:
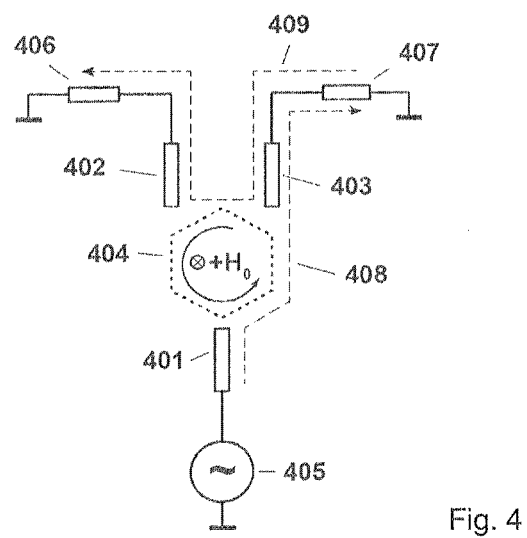
FIG. 4 presents, in a schematic manner, the proposed circulator operating as an isolator.

Due to the fact that they promote the nonreciprocal transmission of electromagnetic signals, circulators are mainly employed as isolators (FIG. 4). The utilization of the developed circulator as an isolator can be analyzed, for example, by considering that: a DC magnetic field +H₀ is applied to the resonant cavity 404; a signal source 405 is connected to the waveguide 401; an output load 407 is connected to the waveguide 403; an ideally matched load 406 is connected to the waveguide 402.

In this case, an electromagnetic signal 408, coming from the signal source 405, is transmitted to the output load 407. However, if the output load is not ideally matched, parasitic reflections 409 will arise from it. As the circulator promotes the nonreciprocal transmission of signals in the counterclockwise direction, these reflections will not return to the signal source 405, being absorbed by the ideally matched load 406. Thus, the signal source 405 is protected against the instabilities usually provoked by these reflections.

The designed circulator can also be used as isolator in the cases where the signal source is connected to the other waveguides or in the case where a DC magnetic field $-H_0$ is applied to the device. In these cases, the positions of the output load and of the ideally matched load must be changed, accordingly to the analysis performed before.

Figure 5:
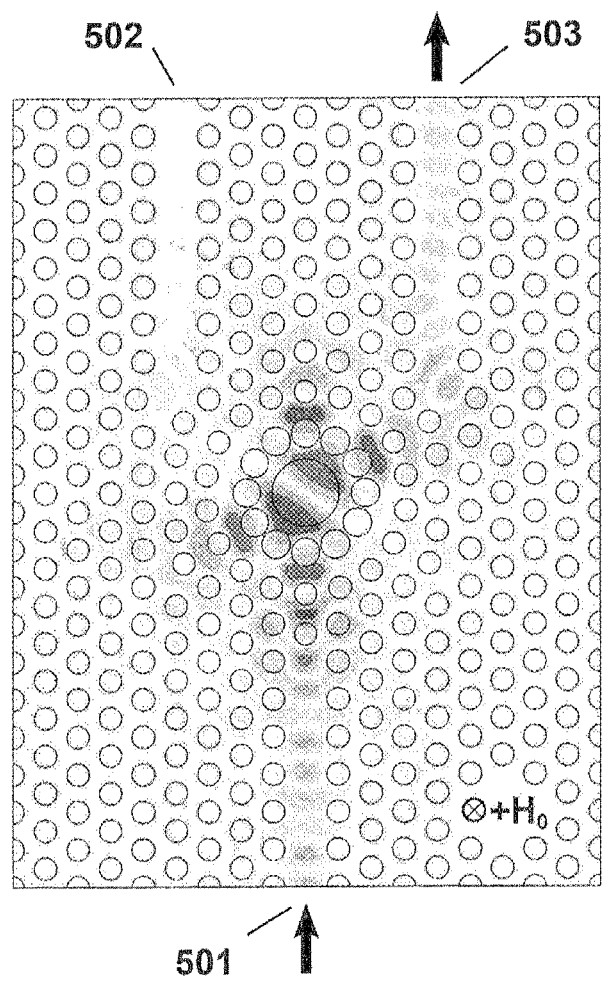
FIG. 5 shows a top view of the device when it is subjected to a DC magnetic field +H₀, with excitation applied to port 1, in which it is possible to see the photonic crystal, the three waveguides and the resonant cavity that comprise the device, as well as the electromagnetic field component $H_z$, at the normalized central frequency ωa/2πc=0.30467, where: ω is the angular frequency (in radians per second); a is the lattice constant of the crystal (in meters); c is the speed of light in free space (approximately equal to 300,000,000 meters per second).

The electromagnetic field profile, considering the excitation being applied to the port 501 and the application of a DC magnetic field $+H_0$ to the device, is shown in FIG. 5. In this figure, it is shown the electromagnetic field component $H_z$, at the normalized central frequency $\omega a/2\pi c=0.30467$. In this case, one can see, in a detailed manner, that a dipole mode with nodes aligned to the waveguide 502 is excited inside the resonant cavity of the device, with almost equal field distribution between the waveguides 501 and 503. Thus, the input signal is transferred, with low losses, to the waveguide 503, with the isolation of waveguide 502.

Figure 6:
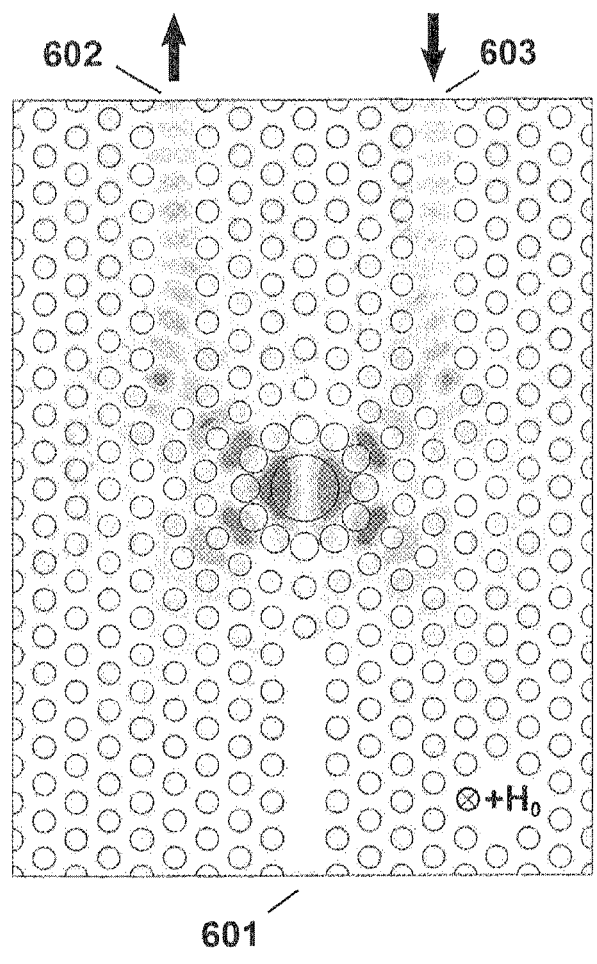
FIG. 6 shows a top view of the circulator when it is subjected to the application of a DC magnetic field +H₀, with excitation applied to port 3, in which it is possible to see the photonic crystal, the three waveguides and the resonant cavity that comprise the device, as well as the electromagnetic field component $H_z$, at the normalized central frequency ωa/2πc=0.30467.

When the excitation is applied to the waveguide 603 and a DC magnetic field $+H_0$ is applied to the device, as shown, in a detailed manner, in FIG. 6, one can see that the dipole mode excited inside the resonant cavity has its nodes aligned with the waveguide 601, with almost equal field distribution between the waveguides 602 and 603. It is represented, in this figure, the electromagnetic field component $H_z$, at the normalized central frequency $\omega a/2\pi c=0.30467$, and it is possible to see the transmission of the input signal from waveguide 603 to waveguide 602, while the waveguide 601 remains isolated.

The operation of the circulator as an isolator, shown in a schematic manner in FIG. 4, can be verified in a detailed manner in FIGS. 5 and 6. By means of an analogy between FIG. 4 and FIGS. 5 and 6, one can say that, in FIG. 5, it is represented the transmission of signals between the signal source and the output load, while in FIG. 6 it is represented the absorption of the parasitic reflections, coming from the output load, in the ideally matched load, with protection of the signal source.

Figure 7:
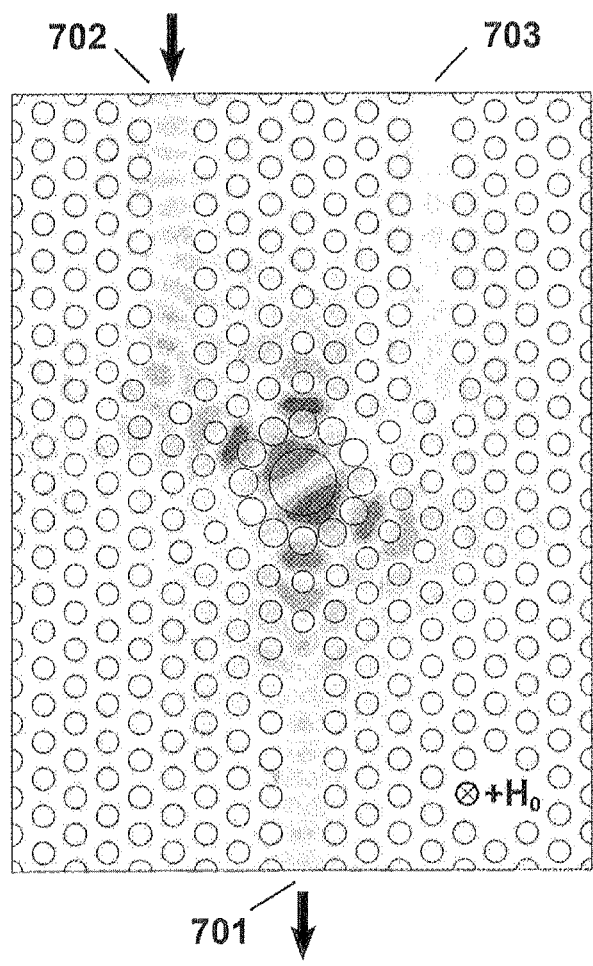
FIG. 7 shows a top view of the developed circulator when the excitation is applied to port 2, with application of a DC magnetic field +H₀, in which it is possible to see the photonic crystal, the three waveguides and the resonant cavity that comprise the device, as well as the electromagnetic field component $H_z$, at the normalized central frequency ωa/2πc=0.30467.

The electromagnetic field component $H_z$ at the normalized central frequency $\omega a/2\pi c=0.30467$, in the case where the excitation is applied to the waveguide 702 and the DC magnetic field $+H_0$ is applied to the circulator, is shown in FIG. 7. In this case, there is an almost equal field distribution of the excited dipole mode between waveguides 702 and 701, while waveguide 703 is aligned with the dipole nodes. Thus, it takes place the transmission of signals from waveguide 702 to waveguide 701, with isolation of waveguide 703.

Figure 8:
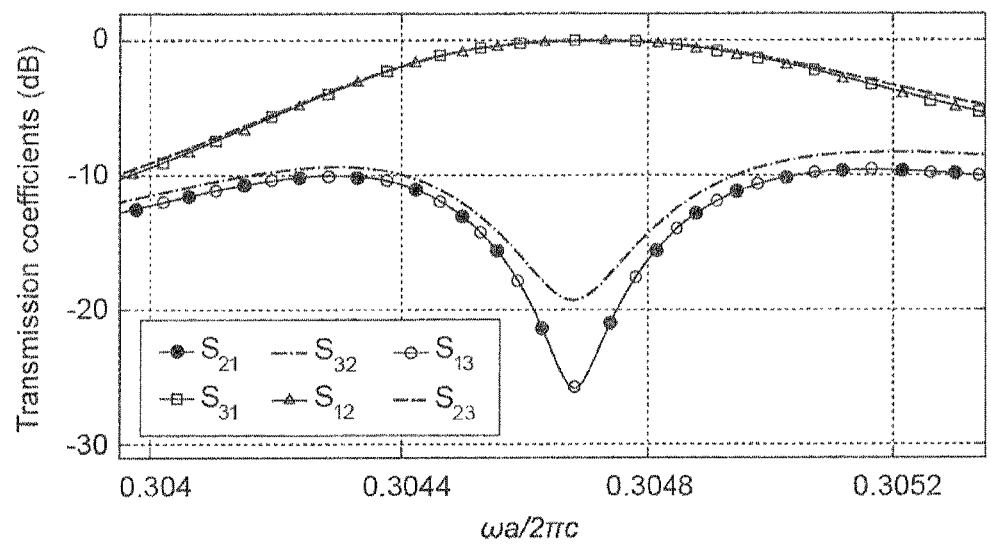
FIG. 8 presents the frequency response of the circulator when it is subjected to a DC magnetic field +H₀.

The frequency response of the circulator, in the case where a DC magnetic field $+H_0$ is applied to the device, is shown in FIG. 8. At the normalized central frequency $\omega a/2\pi c=0.30467$, the insertion losses are lower than $-0.45$ dB. The bandwidth, defined at the level $-15$ dB of the isolation curves, is equal to 173 GHz for ports 1 and 3, and equal to 133 GHz for port 2, considering that the circulator operates with operating wavelength equal to 1.55 µm.

The invention claimed is:

1. An optical three-port fork-like circulator device based on a two-dimensional photonic crystal with a triangular lattice of holes, comprising a magnetic photonic crystal formed of a magneto-optical material in which are inserted first, second and third parallel waveguides and a single resonant cavity all formed by air defects in the photonic crystal, configured to isolate and protect input signal sources against parasitic reflections in a communication system with high integration density of components, wherein the photonic crystal has a lattice constant of 480 nm and an operating wavelength of 1550 nm, and, wherein when an external DC magnetic field +H0 is lied to the photonic crystal, the propagation of electromagnetic signals (input port→output port) occurs in the counterclockwise direction (first port→third port, third port→second port, and second port→first port); and wherein when an external DC magnetic field −H0 is applied to the photonic crystal, the propagation of electromagnetic signals (input port→output port) occurs in the clockwise direction (first port→second port, second port→third port, and third port→first port).

2. An optical three-port fork-like circulator device based on a two-dimensional magnetic photonic crystal with a triangular lattice of holes, wherein the photonic crystal is formed of a magneto-optical material in which are inserted first, second and third parallel waveguides configured to isolate and protect input signal sources, and a single resonant cavity all formed by air defects in the photonic crystal, and wherein the device is configured to provide nonreciprocal transmission of electromagnetic signals in clockwise and counterclockwise directions, depending on the direction of a DC magnetic field applied to the device, wherein the photonic crystal has a lattice constant of 480 nm and an operating wavelength of 1550 nm, and wherein when an external DC magnetic field +H0 is applied to the photonic crystal, the propagation of electromagnetic signals (input port→output port) occurs in the counterclockwise direction (first port→third port, third port→second port, and second port→first port); and wherein when an external DC magnetic field −H0 is applied t the photonic crystal, the propagation of electromagnetic signals (input port→output port) occurs in the clockwise direction (first port→second port, second port→third port, and third port→first port).

3. An optical three-port fork-like circulator device based on a two-dimensional magnetic photonic crystal with a triangular lattice of holes, wherein the photonic crystal is formed of a magneto-optical material in which are inserted first, second and third parallel waveguides configured to isolate and protect input signal sources, and a single resonant cavity all formed by air defects in the photonic crystal, and wherein a dipole mode excited in the resonant cavity of the device is oriented such that its field distribution is almost the same between input and output ports of the device, with its nodes aligned with the isolated waveguide, wherein the photonic crystal has a lattice constant of 480 nm and an operating wavelength of 1550 nm, and wherein when an external DC magnetic field +H0 is applied to the photonic crystal, the propagation of electromagnetic signals (input port→output port) occurs in the counterclockwise direction (first port→third port, third port→second port, and second port→first port); and wherein when an external DC magnetic field −H0 is applied to the photonic crystal, the propagation of electromagnetic signals (input port→output port) occurs in the clockwise direction (first port→second port, second port→third port, and third port→first port).

4. An optical three-port fork-like circulator device based on a two-dimensional magnetic photonic crystal with a triangular lattice of holes, wherein the photonic crystal is formed of a magneto-optical material in which are inserted first, second and third parallel waveguides configured to isolate and protect input signal sources, and a single resonant cavity all formed by air defects in the photonic crystal, wherein the photonic crystal has a lattice constant of 480 nm and an operating wavelength of 1550 nm, and wherein when the device is subjected to a DC magnetic field at the operating normalized central frequency $\omega a/2\pi c=0.30467$, where ω is the angular frequency in radians per second, a is the lattice constant of the crystal in meters, and c is the speed of light in free space in meters per second, insertion losses are lower than −0.45 dB, while the bandwidth, defined at the level −15 dB of the isolation curves, is equal to 173 GHz for ports 1 and 3, and equal to 133 GHz for port 2, considering an operation wavelength λ=1.55 µm, and wherein when an external DC magnetic field +H0 is applied to the photonic crystal, the propagation of electromagnetic signals (input port→output port) occurs in the counterclockwise direction (first port→third port, third port→second port, and second port→first port); and wherein when an external DC magnetic field −H0 is applied to the photonic crystal, the propagation of electromagnetic signals (input port→output port) occurs in the clockwise direction (first port→second port, second port→third port, and third port→first port).

5. The optical three-port fork-like circulator device of claim 1, wherein the air defects are linear defects.

6. The optical three-port fork-like circulator device of claim 1, wherein the air defects are local defects.

7. The optical three-port fork-like circulator device of claim 2, wherein the air defects are linear defects.

8. The optical three-port fork-like circulator device of claim 2, wherein the air defects are local defects.

9. The optical three-port fork-like circulator device of claim 3, wherein the air defects are linear defects.

10. The optical three-port fork-like circulator device of claim 3, wherein the air defects are local defects.

11. The optical three-port fork-like circulator device of claim 4, wherein the air defects are linear defects.

12. The optical three-port fork-like circulator device of claim 4, wherein the air defects are local defects.

13. The optical three-port fork-like circulator device of claim 1, wherein the magneto-optical material comprises bismuth iron garnet.

14. The optical three-port fork-like circulator device of claim 2, wherein the magneto-optical material comprises bismuth iron garnet.

15. The optical three-port fork-like circulator device of claim 3, wherein the material comprises bismuth iron garnet.

16. The optical three-port fork-like circulator device of claim 4, wherein the magneto-optical material comprises bismuth iron garnet.

* * * * *